(12) United States Patent
Tokunaga et al.

(10) Patent No.: US 10,053,137 B2
(45) Date of Patent: Aug. 21, 2018

(54) REAR WHEEL STEERING DEVICE

(71) Applicant: NTN CORPORATION, Osaka (JP)

(72) Inventors: Hironori Tokunaga, Shizuoka (JP); Takashi Koike, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/303,575

(22) PCT Filed: Apr. 7, 2015

(86) PCT No.: PCT/JP2015/060832
§ 371 (c)(1),
(2) Date: Oct. 12, 2016

(87) PCT Pub. No.: WO2015/159758
PCT Pub. Date: Oct. 22, 2015

(65) Prior Publication Data
US 2017/0029012 A1 Feb. 2, 2017

(30) Foreign Application Priority Data

Apr. 16, 2014 (JP) .................. 2014-084256

(51) Int. Cl.
*B62D 5/00* (2006.01)
*B62D 5/04* (2006.01)
(Continued)

(52) U.S. Cl.
CPC ............. *B62D 5/008* (2013.01); *B62D 3/02* (2013.01); *B62D 5/0421* (2013.01);
(Continued)

(58) Field of Classification Search
CPC ............ B62D 5/0427; B62D 7/1581
See application file for complete search history.

(56) References Cited

U.S. PATENT DOCUMENTS 4,741,409 A * 5/1988 Westercamp .......... B62D 5/001
180/402
6,557,658 B1 5/2003 Enmeiji et al.
(Continued)

FOREIGN PATENT DOCUMENTS

DE 199 02 556 7/2000
EP 2 759 458 7/2014
(Continued)

OTHER PUBLICATIONS

International Preliminary Report on Patentability and Written Opinion of the International Searching Authority dated Oct. 18, 2016 in corresponding International Application No. PCT/JP2015/060832.
(Continued)

*Primary Examiner* — Kevin Hurley
(74) *Attorney, Agent, or Firm* — Wenderoth, Lind & Ponack, L.L.P.

(57) ABSTRACT

It is an object of the present invention to provide a rear wheel steering device of which the weight is not added to unsprung weight, and which can steer right and left rear wheels independently of each other. The rear wheel steering device includes a first rod connected to the left rear wheel, a first driving portion configured to axially move the first rod, a second rod connected to the right rear wheel, and a second driving portion configured to axially move the second rod. A single housing supports the first rod, the first driving portion, the second rod, and the second driving portion.

20 Claims, 5 Drawing Sheets

(51) Int. Cl.
  *B62D 7/09*   (2006.01)
  *B62D 7/15*   (2006.01)
  *B62D 3/02*   (2006.01)
  *B62D 9/00*   (2006.01)

(52) U.S. Cl.
  CPC ............ *B62D 5/0427* (2013.01); *B62D 7/09* (2013.01); *B62D 7/1581* (2013.01); *B62D 9/002* (2013.01)

(56) References Cited

U.S. PATENT DOCUMENTS

| | | | |
|---|---|---|---|
| 9,079,604 B2 * | 7/2015 | Di Giusto | ................ B62D 7/09 |
| 2008/0162009 A1 | 7/2008 | Miki et al. | |
| 2008/0184838 A1 | 8/2008 | Hayashi et al. | |
| 2010/0019465 A1 | 1/2010 | Yuta et al. | |

FOREIGN PATENT DOCUMENTS

| | | | |
|---|---|---|---|
| JP | 3-57771 | 3/1991 | |
| JP | 2001-19381 | 1/2001 | |
| JP | 2006-248506 | 9/2006 | |
| JP | 2006-327571 | 12/2006 | |
| JP | 2009-113730 | 5/2009 | |
| JP | 2009-173192 | 8/2009 | |
| JP | 2010-69896 | 4/2010 | |
| JP | 2013-159131 | 8/2013 | |
| JP | 2016147513 A | * 8/2016 | ............... B62D 5/04 |

OTHER PUBLICATIONS

Extended European Search Report dated Mar. 28, 2017 in European Application No. 157791912.

* cited by examiner

REAR WHEEL STEERING DEVICE

TECHNICAL FIELD

The present invention relates to a rear wheel steering device used in a vehicle such as an automobile.

BACKGROUND ART

In order to increase the travel stability of automobiles when they turn or travel in a straight line, the following automobiles are starting to be practically used: automobiles including a mechanism for steering the rear wheels in addition to a mechanism for steering the front wheels, or automobiles including a mechanism for changing the toe angles of the rear wheels in accordance with their travel state.

Japanese Unexamined Patent Application Publication No. 2009-173192 discloses a rear wheel steering device for steering rear wheels in accordance with the steering angles of front wheels when a driver steers a steering wheel. This rear wheel steering device includes linear motion actuators provided to the right and left rear wheels, respectively. By the respective linear motion actuators, it is possible to steer the right rear wheel and the left rear wheel independently of each other. This rear wheel steering device can steer the rear wheels in the same direction as or in the direction opposite to the steering angles of the front wheels so as to increase the travel stability of the vehicle when the vehicle turns, or can adjust their toe angles by steering the right and left rear wheels so as to increase the travel stability of the vehicle when the vehicle travels in a straight line.

Japanese Unexamined Patent Application Publication No. 2013-159131 discloses a rear wheel steering device for steering right and left rear wheels together. This rear wheel steering device includes a steering housing fixed to the vehicle, a single, rear wheel steering shaft axially movably supported by the steering housing, a pair of tie rods coupled to the respective ends of the single, rear wheel steering shaft, and knuckle arms coupled to the respective tie rods. By axially moving the single, rear wheel steering shaft, this rear wheel steering device can change the respective steering angles of the right and left rear wheels such that the rear wheels are steered in the same direction as or in the direction opposite to the steering angles of front wheels.

In the rear wheel steering device of Japanese Unexamined Patent Application Publication No. 2009-173192, the linear motion actuators configured to steer the right and left rear wheels, respectively, are mounted below springs of respective suspensions (i.e., not mounted to the side of the vehicle body supported through the suspensions, but mounted to the sides of the wheels supporting the vehicle body through the respective suspensions). Therefore, the weight of the rear wheel steering device is added to unsprung weight, so that a driver might not be able to enjoy a comfortable ride in the vehicle.

In the rear wheel steering device of Japanese Unexamined Patent Application Publication No. 2013-159131, since the steering housing is fixed to the side of the vehicle body, the weight of the rear wheel steering device is not added to unsprung weight. However, this rear wheel steering device cannot steer the right and left rear wheels independently of each other for "toe-in", "toe-out", etc.

SUMMARY OF THE INVENTION

It is an object of the present invention to provide a rear wheel steering device of which the weight is not added to unsprung weight, and which can steer right and left rear wheels independently of each other.

In order to achieve the above object, the present invention provides a rear wheel steering device comprising: an axially movably supported first rod connected to one rear wheel of right and left rear wheels of a vehicle such that as the first rod axially moves, a direction of the one rear wheel changes; a first driving portion configured to axially move the first rod; a second rod supported so as to be axially movable independently of the first rod, and connected to the other rear wheel of the right and left rear wheels such that as the second rod axially moves, a direction of the other rear wheel changes; a second driving portion configured to axially move the second rod; and a single housing supporting the first rod, the first driving portion, the second rod, and the second driving portion.

With this arrangement, the rear wheel steering device can steer the left rear wheel and the right rear wheel independently of each other by axially moving the first rod and the second rod independently of each other. Also, by fixing the housing of the rear wheel steering device to the side of the vehicle body supported by the wheels through suspensions, the weight of the rear wheel steering device is not added to unsprung weight.

The rear wheel steering device may be configured such that the first driving portion comprises: a first electric motor; a first speed reducer configured to decelerate and transmit a rotation of the first electric motor; and a first motion converting mechanism configured to convert the rotation decelerated by the first speed reducer into an axial movement of the first rod. The first motion converting mechanism comprises: a first rotary member to which the rotation decelerated by the first speed reducer is input, and which is supported so as to be rotatable and axially unmovable; an anti-rotation mechanism by which the first rod is rotationally fixed while being axially movable; and an externally threaded portion and an internally threaded portion which enable the first rod and the first rotary member to be threadedly engaged with each other such that the first rod axially moves in accordance with a rotation of the first rotary member. The second driving portion comprises: a second electric motor provided separately from the first electric motor; a second speed reducer configured to decelerate and transmit a rotation of the second electric motor; and a second motion converting mechanism configured to convert the rotation decelerated by the second speed reducer into an axial movement of the second rod. The second motion converting mechanism comprises: a second rotary member to which the rotation decelerated by the second speed reducer is input, and which is supported so as to be rotatable and axially unmovable; an anti-rotation mechanism by which the second rod is rotationally fixed while being axially movable; and an externally threaded portion and an internally threaded portion which enable the second rod and the second rotary member to be threadedly engaged with each other such that the second rod axially moves in accordance with a rotation of the second rotary member.

With this arrangement, the first and second electric motors, provided separately from each other, can control the respective directions of the left and right rear wheels independently of each other.

The first driving portion and the second driving portion may be arranged so as to form substantially mirror images of each other relative to a center of the single housing. With this arrangement, the same components can be used for the first driving portion and the second driving portion.

The rear wheel steering device may further comprise: a pair of first thrust rolling bearings by which the first rotary member is axially supported while being rotatable such that an axial movement of the first rotary member is restricted; and a pair of second thrust rolling bearings by which the second rotary member is axially supported while being rotatable such that an axial movement of the second rotary member is restricted.

With this arrangement, since the pair of first thrust rolling bearings and the pair of second rolling bearings separately and individually support the axial load applied to the first rotary member from the left rear wheel through the first rod, and the axial load applied to the second rotary member from the right rear wheel through the second rod, the first and second thrust rolling bearings are capable of supporting these axial loads while having high rigidity, and enabling the first and second rotary members to rotate with a low torque.

The rear wheel steering device may further comprise: a first inner diameter portion formed on the first rotary member, and encasing the first thrust rolling bearings; a first flange sandwiched between the first thrust rolling bearings; a first coupling shaft through which the first flange is unmovably coupled to the housing; a first pressing plate pressing the first thrust rolling bearings into the first inner diameter portion; a second inner diameter portion formed on the second rotary member, and encasing the second thrust rolling bearings; a second flange sandwiched between the second thrust rolling bearings; a second coupling shaft through which the second flange is unmovably coupled to the housing; and a second pressing plate pressing the second thrust rolling bearings into the second inner diameter portion.

The rear wheel steering device may be configured such that the single housing includes a partition wall between the first driving portion and the second driving portion, and the first coupling shaft and the second coupling shaft are coupled together through the partition wall.

The rear wheel steering device may further comprise a first radial bearing radially supporting the first rotary member, and a second radial bearing radially supporting the second rotary member.

With this arrangement, since it is possible to prevent radial run-out of the first and second rotary members, the externally threaded portions and the internally threaded portions can smoothly rotate relative to each other.

The rear wheel steering device may be configured such that the first electric motor comprises a hollow rotor arranged coaxially with the first rod, and surrounding the first rod, and a stator configured to apply a rotational force to the rotor, and such that the second electric motor comprises a hollow rotor arranged coaxially with the second rod, and surrounding the second rod, and a stator configured to apply a rotational force to the rotor of the second electric motor.

With this arrangement, the first electric motor is arranged coaxially with the first rod, and the second electric motor is also arranged coaxially with the second rod. Therefore, the rear wheel steering device is short in the axial direction, and thus extremely small-sized.

The rear wheel steering device may be configured such that the first speed reducer comprises; a first sun gear mounted to an outer periphery of the rotor of the first electric motor at an end portion of the rotor of the first electric motor; a first internal gear fixed to the housing: a first planetary gear meshing with both the first sun gear and the first internal gear; and a first planetary carrier supporting the first planetary gear such that the first planetary gear can rotate about an axis of the first planetary gear and revolve around the first sun gear. The first planetary carrier is coupled to the first rotary member so as to rotate together with the first rotary member. The second speed reducer comprises a second sun gear mounted to an outer periphery of the rotor of the second electric motor at an end portion of the rotor of the second electric motor; a second internal gear fixed to the housing; a second planetary gear meshing with both the second sun gear and the second internal gear; and a second planetary carrier supporting the second planetary gear such that the second planetary gear can rotate about an axis of the second planetary gear and revolve around the second sun gear. The second planetary carrier is coupled to the second rotary member so as to rotate together with the second rotary member.

With this arrangement, it is possible to effectively decelerate the rotation of the rotor of the first electric motor, surrounding the first rod, and transmit it to the first rotary member. Similarly, it is possible to effectively decelerate the rotation of the rotor of the second electric motor, surrounding the second rod, and transmit it to the second rotary member.

Effects of the Invention

The rear wheel steering device of the present invention can steer the left rear wheel and the right rear wheel independently of each other by axially moving the first rod and the second rod independently of each other. Also, by fixing the housing of the rear wheel steering device to the side of the vehicle body supported by the wheels through the suspensions, the weight of the rear wheel steering device is not added to unsprung weight.

DETAILED DESCRIPTION OF THE INVENTION

Figure 1:
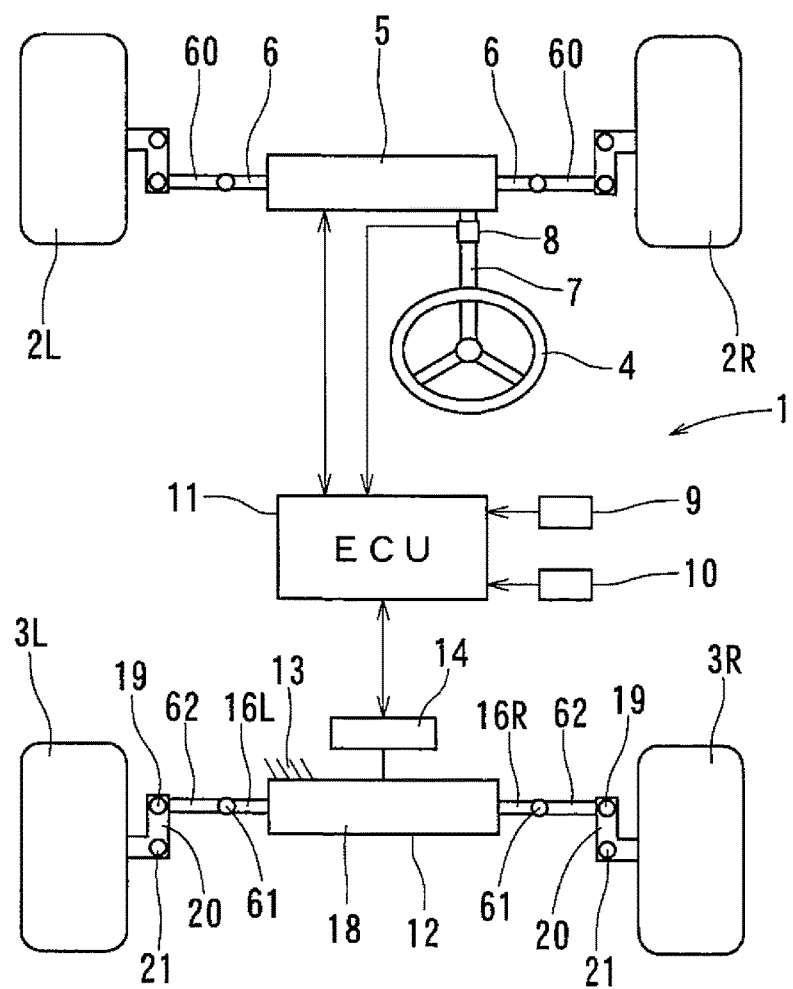
FIG. 1 is a schematic diagram of a vehicle provided with a rear wheel steering device according to an embodiment of the present invention.

FIG. 1 schematically illustrates the structure of a vehicle 1 provided with a rear wheel steering device 12 according to the present invention. This vehicle 1 is an automobile including a pair of right and left front wheels 2R and 2L, and a pair of right and left rear wheels 3R and 3L.

Steering rods 6 of a front wheel steering mechanism 5 move in accordance with the steering angle of the steering wheel 4, thereby steering the front wheels 2R and 2L. Namely, when a driver steers the steering wheel 4, the rotation of the steering wheel 4 is transmitted to the front wheel steering mechanism 5 through a steering column 7, so that the steering rods 6 of the front wheel steering mechanism 5 move axially. The linear/axial movements of the steering rods 6 are transmitted to the front wheels 2R and 2L through respective tie rods 60, so that the directions of the respective front wheels 2R and 2L change together. The steering column 7, which rotates together with the steering wheel 4, is provided with a steering angle sensor 8. The outputs from the steering angle sensor 8, a vehicle speed sensor 9, and a yaw rate sensor 10 are input to an electronic control unit (ECU) 11.

The rear wheel steering device 12 steers the rear wheels 3R and 3L. The rear wheel steering device 12 is not attached to any of the sides of the rear wheels 3R and 3L supported through respective suspensions (not shown), but instead is attached to the side of the vehicle body 13 supported through the suspensions. A rear wheel steering control device 14 controls the steering angles of the respective rear wheels 3R and 3L, by receiving, from the electronic control unit 11, the command based on the travel information of the vehicle 1 obtained from the steering angle sensor 8, the vehicle speed sensor 9, and the yaw rate sensor 10, etc. The rear wheel steering control device 14 controls the steering angles of the rear wheels 3R and 3L independently of each other.

FIGS. 2 to 5 illustrate the structure of the rear wheel steering device 12.

Figure 2:
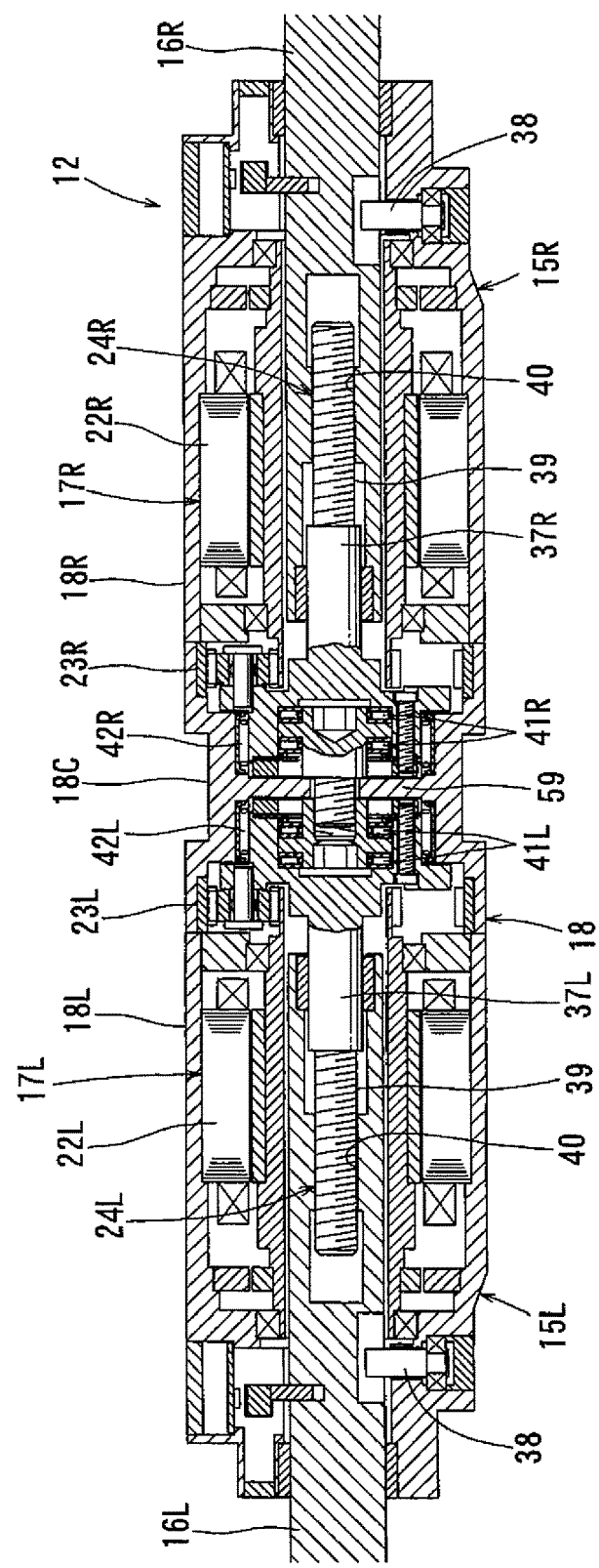
FIG. 2 is a sectional view of the rear wheel steering device illustrated in FIG. 1.

As illustrated in FIG. 2, the rear wheel steering device 12 is constituted by a first steering portion 15L configured to steer the left rear wheel 3L, and a second steering portion 15R configured to steer the right rear wheel 3R. The first steering portion 15L and the second steering portion 15R are identical in structure to each other, and are arranged so as to form horizontal mirror images of each other relative to the center of the rear wheel steering device 12. Therefore, only the structure of the first steering portion 15L is described below, and the structure of the second steering portion 15R is not described. Though the letter "L" is added after the reference numerals of some components of the first steering portion 15L, and the letter "R" is added after the reference numerals of some components of the second steering portion 15R, the letters "L" and "R" are not added if no distinction is necessary.

The first steering portion 15L includes an axially movably supported first rod 16L, and a first driving portion 17L configured to move the first rod 16L in the axial direction. Similarly, the second steering portion 15R includes an axially movably supported second rod 16R, and a second driving portion 17R configured to move the second rod 16R in the axial direction.

A single (one-piece) housing 18 supports all of the first rod 16L, the first driving portion 17L, the second rod 16R, and the second driving portion 17R. The housing 18 includes a left housing portion 18L, a central housing portion 18C, and a right housing portion 18R, and these housing portions 18L, 18C and 18R are joined together so as to constitute the single housing 18. The first driving portion 17L and the second driving portion 17R are arranged so as to form substantially mirror images of each other relative to the center of the housing 18. The housing 18 is fixed to the vehicle body 13 (see FIG. 1) by means of bolts (not shown).

As illustrated in FIG. 1, the first rod 16L is connected to the rear wheel 3L such that as the first rod 16L moves in the axial direction, the direction of the rear wheel 3L changes. Specifically, the first rod 16L has its end coupled to one end of a tie rod 62 through a ball joint 61, and the tie rod 62 is coupled at the other end thereof to a knuckle arm 20 through a ball joint 19. Thus, when the first rod 16L moves in the axial direction, the knuckle arm 20 pivots about its fulcrum 21 so as to change the direction of the rear wheel 3L. Similarly, the second rod 16R is connected to the rear wheel 3R such that as the second rod 16R moves in the axial direction, the direction of the rear wheel 3R changes.

Figure 3:
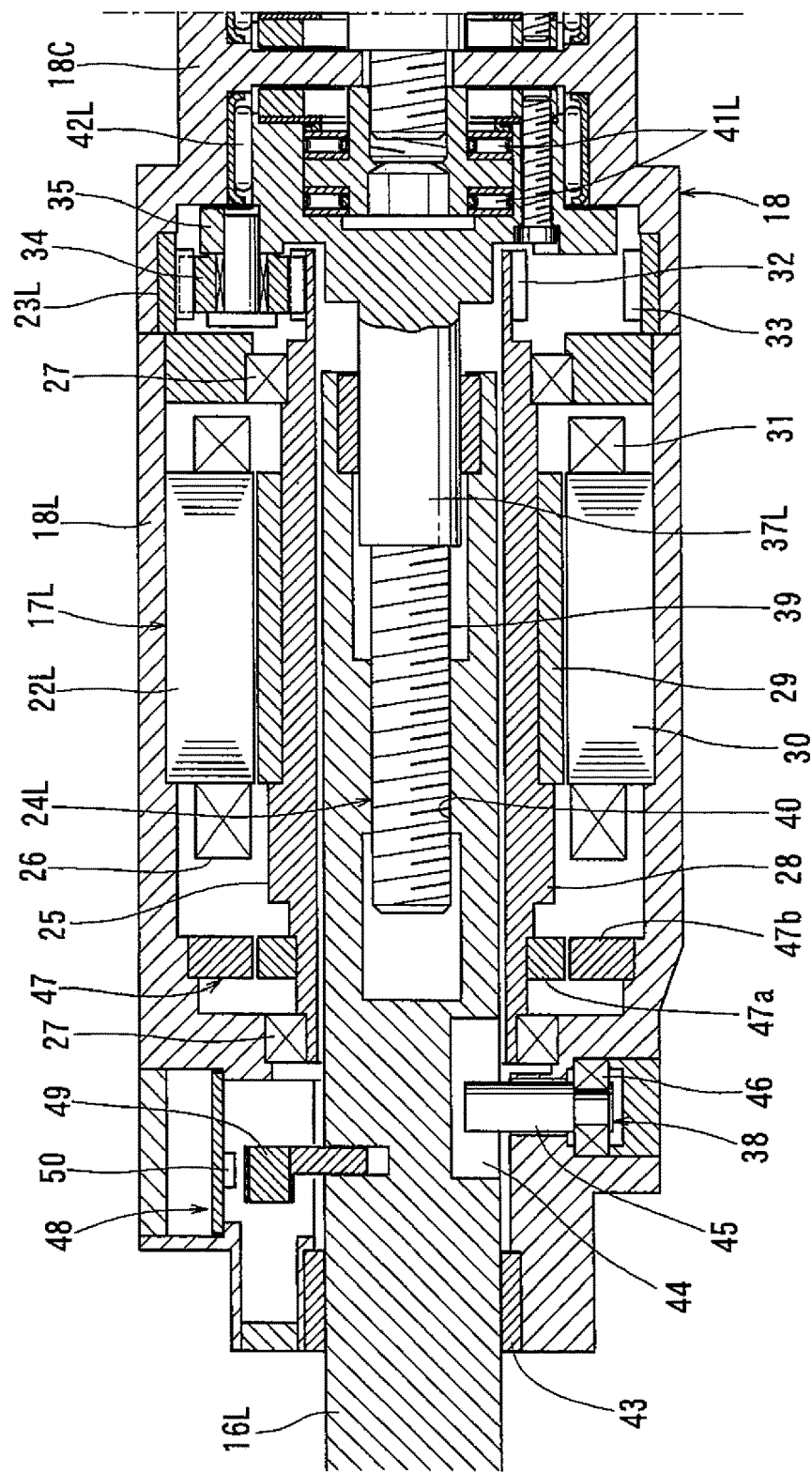
FIG. 3 is an enlarged sectional view of the rear wheel steering device illustrated in FIG. 2 in the vicinity of a first driving portion.

As illustrated in FIG. 2, the first driving portion 17L includes a first electric motor 22L, a first speed reducer 23L configured to decelerate and transmit the rotation of the first electric motor 22L, and a first motion converting mechanism 24L configured to convert the rotation decelerated by the first speed reducer 23L into the axial movement of the first rod 16L As illustrated in FIGS. 2 and 3, the first driving portion 17L and the first rod 16L are coaxial, and the second driving portion 17R and the second rod 16R are coaxial.

As illustrated in FIG. 3, the first electric motor 22L is constituted by a hollow rotor 25 arranged coaxially with the first rod 16L so as to surround the first rod 16L, and a stator 26 configured to apply a rotational force to the rotor 25. The rotor 25 includes a hollow rotor shaft 28 rotatably supported by a pair of right and left rolling bearings 27 mounted to the inner periphery of the left housing portion 18L, and a rotor core 29 fixed to the outer periphery of the rotor shaft 28. The rotor core 29 includes permanent magnets each having a north pole and a south pole, and arranged such that the north poles alternate with the south poles along the circumferential direction. The stator 26 is constituted by a stator core 30 fixed to the inner periphery of the left housing portion 18L, and electromagnetic coils 31 wound around (respective teeth of) the stator core 30. When the electromagnetic coils 31 are energized, a rotational force is applied to the rotor core 29 due to the electromagnetic force generated between the stator core 30 and the rotor core 29, so that the rotor core 29 and the rotor shaft 28 rotate together.

Figure 4:
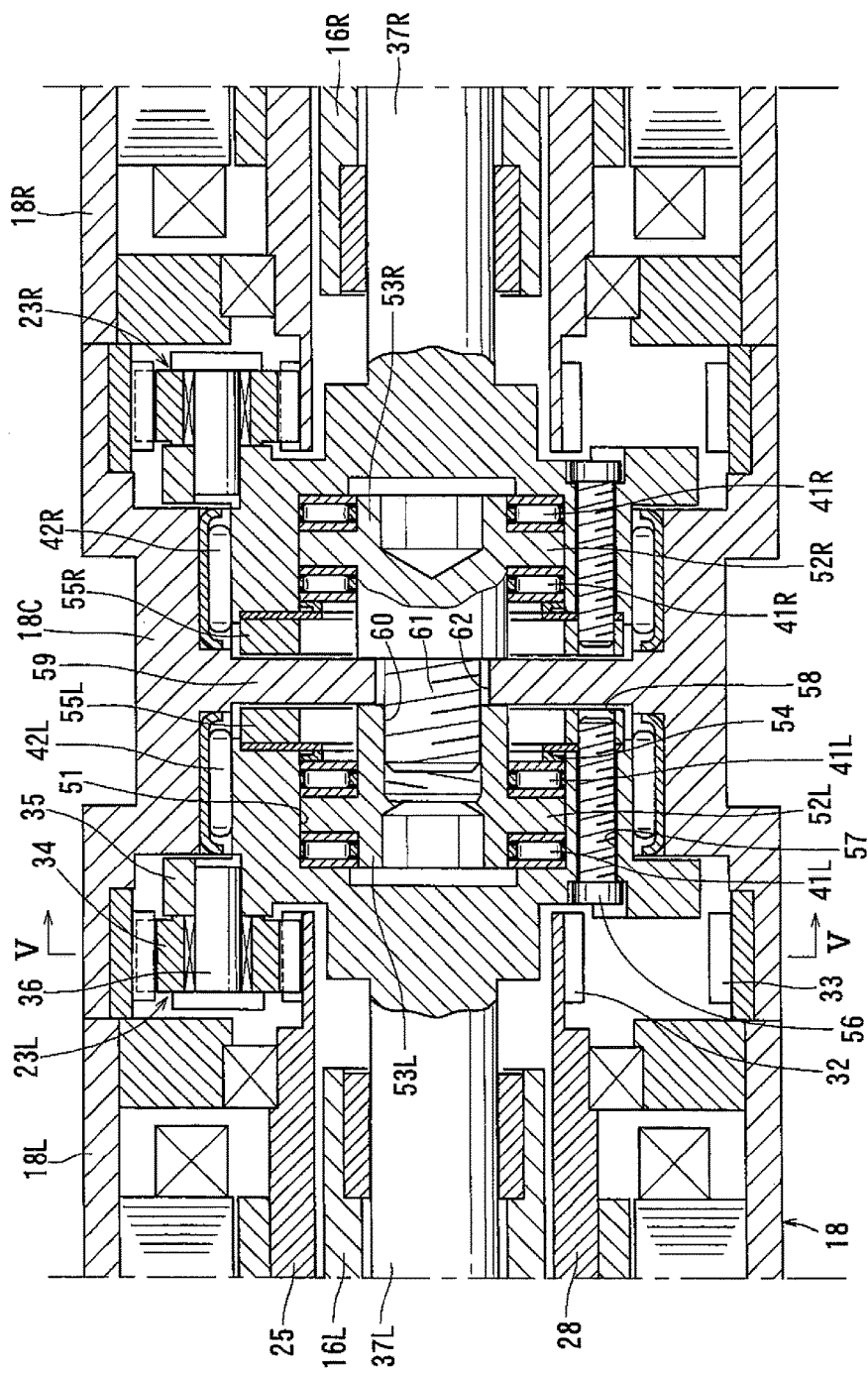
FIG. 4 is an enlarged sectional view of the rear wheel steering device illustrated in FIG. 2 in the vicinity of a first speed reducer and a second speed reducer.

As illustrated in FIG. 4, the first speed reducer 23L includes a sun gear 32 mounted to the outer periphery of the rotor 25 at one end portion thereof, an internal gear 33 fixed to the inner periphery of the central housing portion 18C, a plurality of planetary gears 34 meshing with both the sun gear 32 and the internal gear 33, and a planetary carrier 35 supporting the planetary gears 34 such that the planetary gears 34 can rotate about their respective axes and revolve around the sun gear 32.

Figure 5:
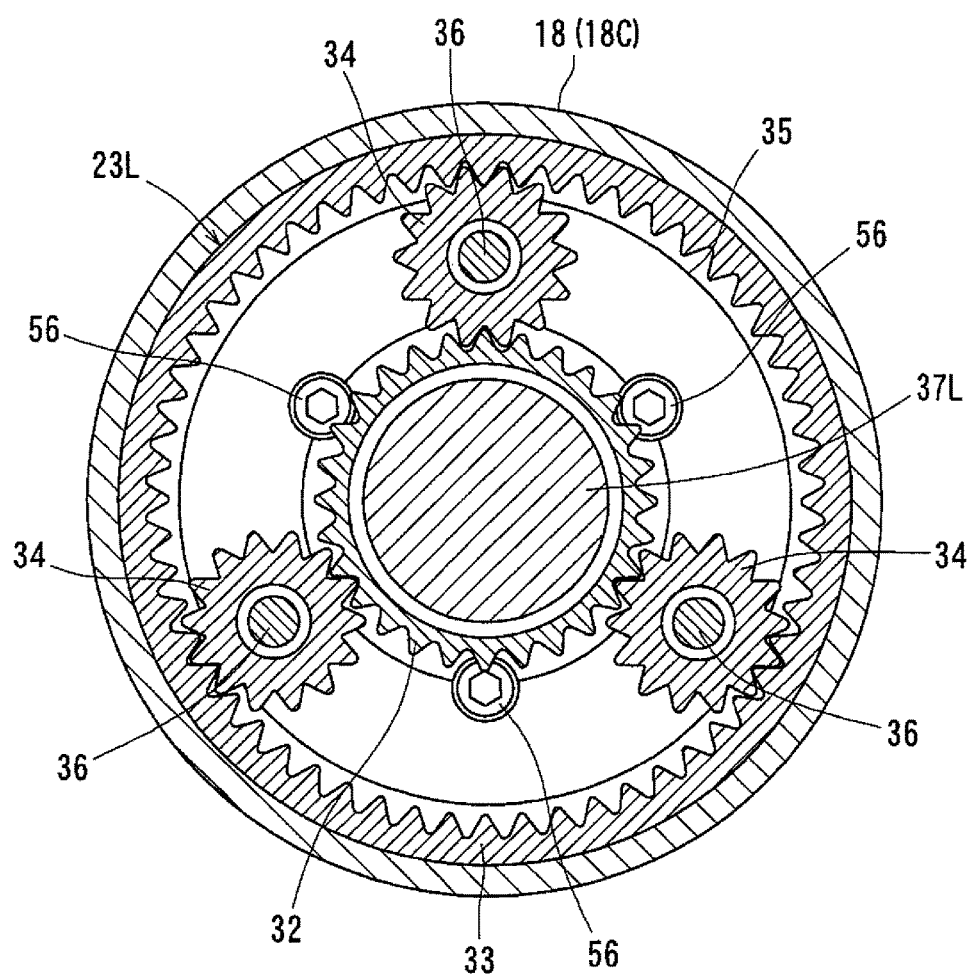
FIG. 5 is a sectional view taken along line V-V of FIG. 4.

As illustrated in FIG. 5, the internal gear 33 is a ring-shape gear opposing the outer diameter side of the sun gear 32. The planetary gears 34 are provided in the annular space defined between the sun gear 32 and the internal gear 33 so as to be circumferentially spaced apart from each other. When the sun gear 32 rotates, the planetary gears 34 revolve around the sun gear 32 while rotating about pins 36 provided at the centers of the respective planetary gears 34.

As illustrated in FIG. 3, the first motion converting mechanism 24L includes a first shaft 37L to which the rotation decelerated by the first speed reducer 23L is input, an anti-rotation mechanism 38 by which the first rod 16L is rotationally fixed while being movable in the axial direction, and an externally threaded portion 39 and an internally threaded portion 40 through which the first shaft 37L and the first rod 16L are threadedly engaged with each other such that the first rod 16L axially moves in accordance with the rotation of the first shaft 37L. The first shaft 37L is coupled to the planetary carrier 35 so as to rotate together with the planetary carrier 35.

The internally threaded portion 40 is formed on the inner periphery of a hole formed in the first rod 16L so as to open to the end of the first rod 16L. The externally threaded portion 39 is formed on the outer periphery of the first shaft 37L at its end portion. The external thread of the externally threaded portion 39 and the internal thread of the internally threaded portion 40 may comprise e.g., trapezoidal threads.

The first shaft 37L is axially supported while being rotatable by a pair of first thrust rolling bearings 41L. The first thrust rolling bearings 41L restrict both of the axial movements (i.e., the rightward and leftward movements) of the first shaft 37L while allowing the first shaft 37 to rotate.

Also, the first shaft 37L is radially supported by a first radial bearing 42L. The first radial bearing 42L comprises a rolling bearing (a needle roller bearing with an outer race is shown in the drawings) inserted between the inner periphery of the central housing portion 18C and the cylindrical outer peripheral surface of the first shaft 37L at its end portion. The first electric motor 22L, the first speed reducer 23L, the externally threaded portion 39, and the internally threaded portion 40 are all arranged coaxially with the first rod 16L.

The first rod 16L is axially movably supported by a sliding bearing 43 attached to the inner periphery of the left housing portion 18L at its open end. The anti-rotation mechanism 38 is constituted by an axially extending groove 44 formed in the outer periphery of the first rod 16L, and a stopper 45 of which the distal end portion is inserted in the groove 44. The stopper 45 is attached to the left housing portion 18L so as to be movable in neither of the axial and circumferential directions of the first rod 16L. The groove 44 is a blind groove, namely, a groove having both axial ends closed.

When the first rod 16L axially moves, the groove 44 axially moves relative to the stopper 45 together with the first rod 16L. When, as a result, the stopper 45 abuts against either of the two end surfaces of the groove 44, the first rod 16L stops, namely, the axial movement of the first rod 16L is restricted. In this way, the anti-rotation mechanism 38, constituted by the groove 44 and the stopper 45, also functions to mechanically restrict the axial movements of the first rod 16L.

A bearing 46 is mounted to the portion of the stopper 45 connected to the left housing portion 18L to rotatably support the stopper 45. Therefore, when the first rod 16L axially moves, even if the distal end portion of the stopper 45 comes into contact with either of the two inner side surfaces of the groove 44, the bearing 46 allows rotation of the stopper 45, thereby reducing uneven wear of the stopper 45 and the inner surfaces of the groove 44.

The first electric motor 22L has a rotation detector 47 attached thereto so as to detect the rotation angle of the rotor 25. The rotation detector 47 may be, for example, a resolver comprising a resolver rotor 47a fixed to one end portion of the hollow rotor shaft 28, and a resolver stator 47b fixed to the left housing portion 18L so as to be opposed to the resolver rotor 47a. The first rod 16L is inserted in the hollow rotor shaft 28. Since the externally threaded portion 39 and the internally threaded portion 40 are arranged inside of the hollow rotor shaft 28, the rear wheel steering device 12 is short in the axial direction.

When the first electric motor 22L rotates, the rotation is decelerated and transmitted by the first speed reducer 23L, thereby rotating the externally threaded portion 39 at the end portion of the first shaft 37L. Corresponding to the rotation of the externally threaded portion 39, the first rod 16L moves in the right or left direction so as to move the knuckle arm 20 through the ball joint 61, the tie rod 62, and the ball joint 19 illustrated in FIG. 1, thereby making it possible to adjust the steering angle or the toe angle of the rear wheel 3L.

The first rod 16L has a position detector 48 attached thereto so as to detect the axial position of the first rod 16L. On the basis of the axial position (absolute position) of the first rod 16L detected by the position detector 48, it is possible to detect the steering angle of the rear wheel 3L. The signal output from the position detector 48 is input to the rear wheel steering control device 14. The position detector 48 may be constituted by, for example, a permanent magnet 49 fixed to the first rod 16L, and a Hall IC 50 configured to perform an analogue output, and fixed to the left housing portion 18L so as to be opposed to the permanent magnet 49.

The position detector 48 detects the axial position (absolute position) of the first rod 16L by converting magnetic flux density detected by the Hall IC 50 into positional information. If a programmable Hall IC is used as the Hall IC 50, it is possible to increase the accuracy of the absolute position thereof by storing, in advance, the relationship between the magnetic flux density and the position of the first rod 16L. Also, by, as the Hall IC 50, selecting a Hall IC having two portions through which a signal is output, even if one of the two portions malfunctions, since it is still possible to detect the position of the first rod 16L by outputting a signal through the other of the two portions, the position detector 48 having such a Hall IC is more reliable.

Though in the embodiment, the position detector 48 uses a Hall IC 50 to detect the position of the first rod 16L, its detecting method is not limited thereto. For example, the position detector 48 may be configured to convert the axial movement of the first rod 16L into a rotation, and detect the rotation by its rotation angle sensor. Also, the absolute position of the first rod 16L may be detected by the position detector 48 when the vehicle 1 is activated, and thereafter the position thereof may be calculated by counting the signal from the rotation detector 47.

A support mechanism by the first thrust rolling bearings 41L and second thrust rolling bearings 41R is now described with reference to FIG. 4. The first shaft 37L has an end surface located on the side of the central housing portion 18C, and formed with an inner diameter portion 51 having a cylindrical inner peripheral surface. The pair of first thrust rolling bearings 41L, axially spaced apart from each other, and a first flange 52L sandwiched between the first thrust rolling bearings 41L are received in the inner diameter portion 51 of the first shaft 37L. The first flange 52L is unmovably coupled to the central housing portion 18C through a first coupling shaft 53L. The first flange 52L is integral with the outer periphery of the first coupling shaft 53L. The first thrust rolling bearings 41L each includes a retainer, needle rollers received in the retainer, and a pair of bearing races between which the retainer and the needle rollers are sandwiched.

At the end surface of the first shaft 37L, there are provided an annular spacer 54 inserted in the inner diameter portion 51 such that a portion of the spacer 54 is located axially outwardly of the end surface of the first shaft 37L, and a first annular pressing plate 55L pressing the first thrust rolling bearings 41L into the inner diameter portion 51 through the spacer 54. The axial position of the first pressing plate 55L is adjustable by means of bolts 56. By tightening the bolts 56, the first pressing plate 55L presses the spacer 54 toward the inner diameter portion 51, thereby applying a preload to the first thrust rolling bearings 41L through the spacer 54. The bolts 56 are inserted in respective axial through holes 57 formed in the portion of the first shaft 37L radially outwardly of the inner diameter portion 51 so as to be circumferentially spaced apart from each other. The portions of the bolts 56 protruding from the through holes 57 are screwed into respective threaded holes 58 formed in the first pressing plate 55L. Since the first thrust rolling bearings 41L are mounted in the inner diameter portion 51 of the first shaft 37, the rear wheel steering device 12 is short in the axial direction.

The central housing portion 18C includes a partition wall 59 between the first driving portion 17L and the second driving portion 17R. The first coupling shaft 53L and the second coupling shaft 53R are fixed to the partition wall 59. In the embodiment, the second coupling shaft 53R has a threaded shaft 61 which extends through a hole 62 formed through the partition wall 59 of the central housing portion 18C, and is threadedly engaged in a threaded hole 60 formed in the end surface of the first coupling shaft 53L. Due to the threaded engagement, the first and second coupling shafts 53L and 53R are pressed against and fixed to the central housing portion 18C.

The rear wheel steering device 12 can steer the left rear wheel 3L and the right rear wheel 3R independently of each other by axially moving the first rod 16L and the second rod 16R independently of each other. Namely, by driving the first electric motor 22L, the first rod 16L moves in the right or left direction independently of the second rod 16R so as to steer the left rear wheel 3L, connected to the first rod 16L, thereby making it possible to adjust the steering angle or the toe angle of the rear wheel 3L. Similarly, by driving the second electric motor 22R, the second rod 16R moves in the right or left direction independently of the first rod 16L so as to steer the right rear wheel 3R, connected to the second rod 16R, thereby making it possible to adjust the steering angle or the toe angle of the rear wheel 3R. In this way, in spite of the fact that the rear wheel steering device 12 is fixed to the vehicle body 13, the rear wheel steering device 12 is capable of steering the left rear wheel 3L and the right rear wheel 3R independently of each other. By driving the first electric motor 22L and the second electric motor 22R at the same time, the rear wheel steering device 12 can also change the steering angles of the right and left rear wheels 3R and 3L together.

The rear wheel steering device 12 is configured such that the first rod 16L, the first driving portion 17L, the second rod 16R, and the second driving portion 17R are all received in and supported by the single housing 18. Since the housing 18 is not fixed to any of the sides of the wheels supporting the vehicle body 13 through respective suspensions, but fixed to the side of the vehicle body 13, supported by the wheels through the suspensions, the weight of the rear wheel steering device 12 will not be added to the unsprung load (weight). Therefore, a driver can enjoy a comfortable ride in the vehicle 1.

Since the first driving portion 17L and the second driving portion 17R of the rear wheel steering device 12 are arranged so as to form substantially mirror images of each other relative to the center of the housing 18, the same components can be used for the first steering portion 15L and the second steering portion 15R. As a result thereof, it is possible to reduce costs.

In the rear wheel steering device 12, since the pair of first thrust rolling bearings 41L and the pair of second rolling bearings 41R separately and individually support the axial load applied to the first shaft 37L from the left rear wheel 3L through the first rod 16L, and the axial load applied to the second shaft 37R from the right rear wheel 3R through the second rod 16R, the bearings 41L and 41R are capable of supporting these axial loads while having high rigidity, and enabling the first and second shafts 37L and 37R to rotate with a low torque. Also, since the first coupling shaft 53L and the second coupling shaft 53R are threadedly engaged with each other so as to be fastened together through the partition wall 59 of the housing 18, the loads applied to the first shaft 37L and the second shaft 37R, respectively, are uniformly applied to the partition wall 59 of the housing 18, thereby making it possible to keep the balance of the right and left rear wheels 3R and 3L.

In the rear wheel steering device 12, the first radial bearing 42L and the second radial bearing 42R, which radially support the first shaft 37L and the second shaft 37R, respectively, prevent radial run-out of the first and second shafts 37L and 37R, thus allowing smooth relative rotation between the externally threaded portion 39 and the internally threaded portion 40.

In the rear wheel steering device 12, since the first electric motor 22L is arranged coaxially with the first rod 16L while being radially aligned with a portion of the first rod 16L, and the second electric motor 22R is also arranged coaxially with the second rod 16R while being radially aligned with a portion of the second rod 16R, the axial lengths of the electric motors 22L and 22R do not add to the axial length of the rear wheel steering device 12, so that the rear wheel steering device 12 is extremely small-sized.

The above embodiment is merely an example in every respect, and the present invention is not limited to the above embodiment. Also, it should be understand that the scope of the present invention is indicated by not the above explanations but the claims, and can include all modifications within the scope of the claims or within the meaning equivalent to the scope of the claims.

DESCRIPTION OF REFERENCE NUMERALS 3L, 3R: rear wheel
16L: first rod
16R: second rod
17L: first driving portion
17R: second driving portion
18: housing
22L: first electric motor
22R: second electric motor
23L: first speed reducer
23R: second speed reducer
24L: first motion converting mechanism
24R: second motion converting mechanism
25: rotor
26: stator
32: sun gear
33: internal gear
34: planetary gear
35: planetary carrier
37L: first shaft
37R: second shaft
38: anti-rotation mechanism
39: externally threaded portion
40: internally threaded portion
41L: first thrust rolling bearing
41R: second thrust rolling bearing
42L: first radial bearing
42R: second radial bearing
51: inner diameter portion
52L: first flange
52R: second flange
53L: first coupling shaft
53R: second coupling shaft
55L: first pressing plate
55R: second pressing plate
59: partition wall

The invention claimed is:
1. A rear wheel steering device comprising:
an axially movably supported first rod connected to one rear wheel of right and left rear wheels of a vehicle such that as the first rod axially moves, a direction of the one wheel changes;

a first driving portion configured to axially move the first rod, the first driving portion and the first rod being coaxial;

a second rod supported so as to be axially movable independently of the first rod, and connected to the other rear wheel of the right and left rear wheels such that as the second rod axially moves, a direction of the other rear wheel changes;

a second driving portion configured to axially move the second rod, the second driving portion and the second rod being coaxial; and a single housing supporting the first rod, the first driving portion, the second rod, and the second driving portion.

2. The rear wheel steering device according to claim 1, wherein the first driving portion comprises:

a first electric motor;

a first speed reducer configured to decelerate and transmit a rotation of the first electric motor; and a first motion converting mechanism configured to convert the rotation decelerated by the first speed reducer into an axial movement of the first rod, wherein the first motion converting mechanism comprises:

a first rotary member to which the rotation decelerated by the first speed reducer is input, and which is supported so as to be rotatable and axially unmovable;

an anti-rotation mechanism by which the first rod is rotationally fixed while being axially movable; and an externally threaded portion and an internally threaded portion which enable the first rod and the first rotary member to be threadedly engaged with each other such that the first rod axially moves in accordance with a rotation of the first rotary member, wherein the second driving portion comprises:

a second electric motor provided separately from the first electric motor;

a second speed reducer configured to decelerate and transmit a rotation of the second electric motor; and a second motion converting mechanism configured to convert the rotation decelerated by the second speed reducer into an axial movement of the second rod, and wherein the second motion converting mechanism comprises:

a second rotary member to which the rotation decelerated by the second speed reducer is input, and which is supported so as to be rotatable and axially unmovable;

an anti-rotation mechanism by which the second rod is rotationally fixed while being axially movable; and an externally threaded portion and an internally threaded portion which enable the second rod and the second rotary member to be threadedly engaged with each other such that the second rod axially moves in accordance with a rotation of the second rotary member.

3. The rear wheel steering device according to claim 2, wherein the first driving portion and the second driving portion are arranged so as to form substantially mirror images of each other relative to a center of the single housing.

4. The rear wheel steering device according to claim 2, further comprising:

a pair of first thrust rolling bearings by which the first rotary member is axially supported while being rotatable such that an axial movement of the first rotary member is restricted; and a pair of second thrust rolling bearings by which the second rotary member is axially supported while being rotatable such that an axial movement of the second rotary member is restricted.

5. The rear wheel steering device according to claim 4, further comprising:

a first inner diameter portion formed on the first rotary member, and encasing the first thrust rolling bearings;

a first flange sandwiched between the first thrust rolling bearings;

a first coupling shaft through which the first flange is unmovably coupled to the housing;

a first pressing plate pressing the first thrust rolling bearings into the first inner diameter portion;

a second inner diameter portion formed on the second rotary member, and encasing the second thrust rolling bearings;

a second flange sandwiched between the second thrust rolling bearings;

a second coupling shaft through which the second flange is unmovably coupled to the housing; and a second pressing plate pressing the second thrust rolling bearings into the second inner diameter portion.

6. The rear wheel steering device according to claim 5, wherein the single housing includes a partition wall between the first driving portion and the second driving portion, and wherein the first coupling shaft and the second coupling shaft are coupled together through the partition wall.

7. The rear wheel steering device according to claim 2, further comprising a first radial bearing radially supporting the first rotary member, and a second radial bearing radially supporting the second rotary member.

8. The rear wheel steering device according to claim 2, wherein the first electric motor comprises a hollow rotor arranged coaxially with the first rod and surrounding the first rod, and a stator configured to apply a rotational force to the rotor, and wherein the second electric motor comprises a hollow rotor arranged coaxially with the second rod and surrounding the second rod, and a stator configured to apply a rotational force to the rotor of the second electric motor.

9. The rear wheel steering device according to claim 8, wherein the first speed reducer comprises:

a first sun gear mounted to an outer periphery of the rotor of the first electric motor at an end portion of the rotor of the first electric motor;

a first internal gear fixed to the housing;

a first planetary gear meshing with both the first sun gear and the first internal gear; and a first planetary carrier supporting the first planetary gear such that the first planetary gear can rotate about an axis of the first planetary gear and revolve around the first sun gear, wherein the first planetary carrier is coupled to the first rotary member so as to rotate together with the first rotary member, wherein the second speed reducer comprises:

a second sun gear mounted to an outer periphery of the rotor of the second electric motor at an end portion of the rotor of the second electric motor;

a second internal gear fixed to the housing:

a second planetary gear meshing with both the second sun gear and the second internal gear; and a second planetary carrier supporting the second planetary gear such that the second planetary gear can rotate about an axis of the second planetary gear and revolve around the second sun gear, and
wherein the second planetary carrier is coupled to the second rotary member so as to rotate together with the second rotary member.

10. The rear wheel steering device according to claim 1, wherein at least a portion of the first driving portion is radially aligned with a portion of the first rod, and at least a portion of the second driving portion is radially aligned with a portion of the second rod.

11. The rear wheel steering device according to claim 10, wherein the first driving portion includes a first electric motor radially aligned with the first rod such that a rotor and a stator of the first electric motor surround the first rod, and the second driving portion includes a second electric motor radially aligned with the second rod such that a rotor and a stator of the second electric motor surround the second rod.

12. A rear wheel steering device comprising:
an axially movably supported first rod connected to one rear wheel of right and left rear wheels of a vehicle such that as the first rod axially moves, a direction of the one wheel changes;
a first driving portion configured to axially move the first rod;
a second rod supported so as to be axially movable independently of the first rod, and connected to the other rear wheel of the right and left rear wheels such that as the second rod axially moves, a direction of the other rear wheel changes;
a second driving portion configured to axially move the second rod; and
a single housing supporting the first rod, the first driving portion, the second rod, and the second driving portion;
wherein the first driving portion comprises:
a first electric motor;
a first speed reducer configured to decelerate and transmit a rotation of the first electric motor; and
a first motion converting mechanism configured to convert the rotation decelerated by the first speed reducer into an axial movement of the first rod,
wherein the first motion converting mechanism comprises:
a first rotary member to which the rotation decelerated by the first speed reducer is input, and which is supported so as to be rotatable and axially unmovable;
an anti-rotation mechanism by which the first rod is rotationally fixed while being axially movable; and
an externally threaded portion and an internally threaded portion which enable the first rod and the first rotary member to be threadedly engaged with each other such that the first rod axially moves in accordance with a rotation of the first rotary member,
wherein the second driving portion comprises:
a second electric motor provided separately from the first electric motor;
a second speed reducer configured to decelerate and transmit a rotation of the second electric motor; and
a second motion converting mechanism configured to convert the rotation decelerated by the second speed reducer into an axial movement of the second rod, and
wherein the second motion converting mechanism comprises:

a second rotary member to which the rotation decelerated by the second speed reducer is input, and which is supported so as to be rotatable and axially unmovable;
an anti-rotation mechanism by which the second rod is rotationally fixed while being axially movable; and
an externally threaded portion and an internally threaded portion which enable the second rod and the second rotary member to be threadedly engaged with each other such that the second rod axially moves in accordance with a rotation of the second rotary member.

13. The rear wheel steering device according to claim 12, wherein the first driving portion and the second driving portion are arranged so as to form substantially mirror images of each other relative to a center of the single housing.

14. The rear wheel steering device according to claim 12, further comprising:
a pair of first thrust rolling bearings by which the first rotary member is axially supported while being rotatable such that an axial movement of the first rotary member is restricted; and
a pair of second thrust rolling bearings by which the second rotary member is axially supported while being rotatable such that an axial movement of the second rotary member is restricted.

15. The rear wheel steering device according to claim 14, further comprising:
a first inner diameter portion formed on the first rotary member, and encasing the first thrust rolling bearings;
a first flange sandwiched between the first thrust rolling bearings;
a first coupling shaft through which the first flange is unmovably coupled to the housing;
a first pressing plate pressing the first thrust rolling bearings into the first inner diameter portion;
a second inner diameter portion formed on the second rotary member, and encasing the second thrust rolling bearings;
a second flange sandwiched between the second thrust rolling bearings;
a second coupling shaft through which the second flange is unmovably coupled to the housing; and
a second pressing plate pressing the second thrust rolling bearings into the second inner diameter portion.

16. The rear wheel steering device according to claim 15, wherein the single housing includes a partition wall between the first driving portion and the second driving portion, and wherein the first coupling shaft and the second coupling shaft are coupled together through the partition wall.

17. The rear wheel steering device according to claim 12, further comprising a first radial bearing radially supporting the first rotary member, and a second radial bearing radially supporting the second rotary member.

18. The rear wheel steering device according to claim 12, wherein the first electric motor comprises a hollow rotor arranged coaxially with the first rod and surrounding the first rod, and a stator configured to apply a rotational force to the rotor, and wherein the second electric motor comprises a hollow rotor arranged coaxially with the second rod and surrounding the second rod, and a stator configured to apply a rotational force to the rotor of the second electric motor.

19. The rear wheel steering device according to claim 18, wherein the first speed reducer comprises:

a first sun gear mounted to an outer periphery of the rotor of the first electric motor at an end portion of the rotor of the first electric motor;
a first internal gear fixed to the housing;
a first planetary gear meshing with both the first sun gear and the first internal gear; and
a first planetary carrier supporting the first planetary gear such that the first planetary gear can rotate about an axis of the first planetary gear and revolve around the first sun gear,
wherein the first planetary carrier is coupled to the first rotary member so as to rotate together with the first rotary member,
wherein the second speed reducer comprises:
a second sun gear mounted to an outer periphery of the rotor of the second electric motor at an end portion of the rotor of the second electric motor;
a second internal gear fixed to the housing:
a second planetary gear meshing with both the second sun gear and the second internal gear; and
a second planetary carrier supporting the second planetary gear such that the second planetary gear can rotate about an axis of the second planetary gear and revolve around the second sun gear, and
wherein the second planetary carrier is coupled to the second rotary member so as to rotate together with the second rotary member.

20. The rear wheel steering device according to claim 12, wherein at least a portion of the first driving portion is radially aligned with a portion of the first rod, and at least a portion of the second driving portion is radially aligned with a portion of the second rod.

* * * * *